Feb. 28, 1967 MASAHIKO FUKAMACHI 3,307,148

PLURAL MATRIX DECODING CIRCUIT

Filed April 5, 1963

INVENTOR.
MASAHIKO FUKAMACHI
BY Hopgood & Calimafde
ATTORNEY

United States Patent Office 3,307,148
Patented Feb. 28, 1967

3,307,148

PLURAL MATRIX DECODING CIRCUIT

Masahiko Fukamachi, Tokyo, Japan, assignor to Nippon Electric Company, Limited, Tokyo, Japan, a corporation of Japan Filed Apr. 5, 1963, Ser. No. 270,913
Claims priority, application Japan, Apr. 16, 1962, 37/15,558
3 Claims. (Cl. 340—166)

This invention relates to a decoding circuit for translating combinations of input signals into corresponding output signals in accordance with a predetermined code. The invention is principally characterized by a plurality of input matrices for dividing the input signals into independent groups so as to simplify the decoding circuit. This invention is useful in character recognition circuits, in which alphanumeric characters are identified by a predetermined digital code, and in any other circuit which involves translating digital information from one code to another.

In the past, decoding circuits have been made in the form of a single decoding matrix having a plurality of input conductors connected to a plurality of output conductors by means of semiconductor diodes or the like. The diode connections were arranged so that each output conductor became energized in response to energization of a predetermined combination of input conductors. These prior art matrices were workable, but they suffered from the drawback of becoming very large and complex for codes involving many input combinations. In accordance with this invention, however, it has been found that decoding circuits can be greatly simplified by using a plurality of input matrices in place of a single input matrix.

Accordingly, the principal object of this invention is to provide a decoding circuit which is simpler than those heretofore known in the art.

Other objects and advantages of the invention will become apparent to those skilled in the art from the following description of one specific embodiment thereof, as illustrated in the attached drawings, in which:

FIG. 1 illustrates one embodiment of this invention as applied to a code in which a group consisting of twenty input conditions corresponds to a group of ten outputs and said twenty input conditions may be classified into two ten-condition groups, each independent of the other.

Figure 1:
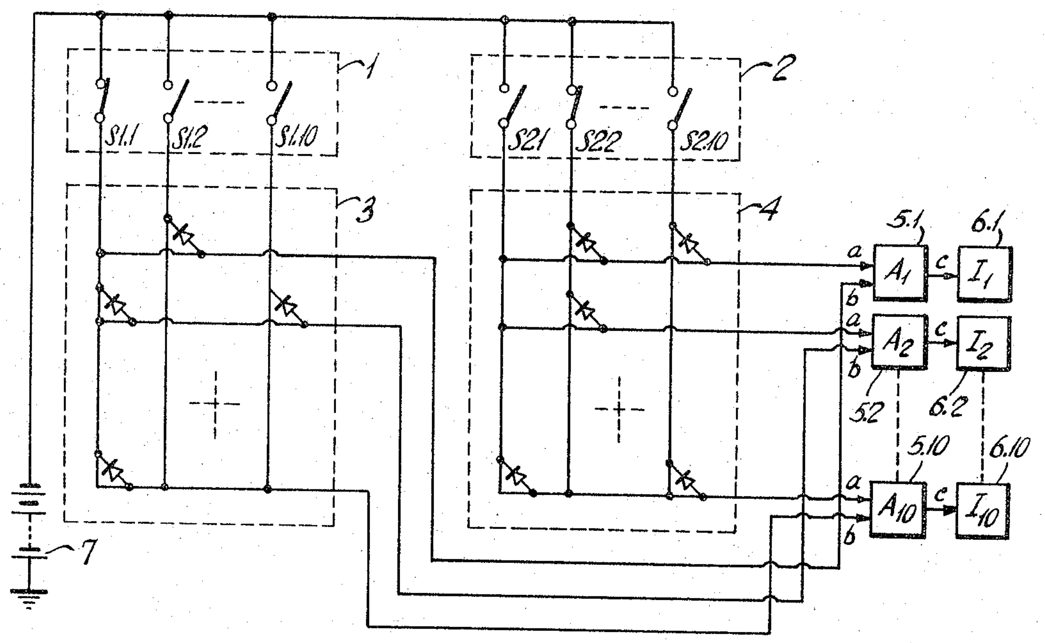
FIG. 1 is a partial schematic diagram of one embodiment of the invention.

Referring to FIG. 1, numerals 1 and 2 denote respectively switch groups composed of switches S1.1 through S1.10 and S2.1 through S2.10 which correspond respectively to the first and second condition groups. 3 and 4 are diode matrices, 5.1 through 5.10 are "AND" gate circuits, 6.1 through 6.10 are output indicator lamps, and 7 denotes a power supply source.

Let it be assumed that in FIG. 1 switches S1.1 through S1.10 and S2.1 through S2.10, or twenty switches in all, correspond to twenty given input conditions respectively and 5.1 through 5.10 (or $A_1$ through $A_{10}$) correspond to ten outputs according to the subscripts, respectively. Let it further be assumed that a diode is connected at each output element position in each of the two matrices 3 and 4 in such manner that a current may flow in an output element only for a particular input condition, as analyzed in detail below.

By selecting a switch in switch group 1 which corresponds to a particular input condition and turning "on" said switch, a voltage is applied to a particular column only in matrix 3 that corresponds to the given input condition and currents (or a current) flow through diodes (or a diode) in rows (or a row) corresponding to an output satisfying said condition while a voltage or voltages are applied to the input terminals *b* of the "AND" gate circuit of the output (or the outputs) corresponding to the input condition.

By turning "ON" a switch in the next place corresponding to a second input condition which has been selected from among switches in the switch group 2, a voltage is applied to a column (or columns) in matrix 4 corresponding to a given input condition in the same manner as in case of matrix 3 and hence, voltages are applied to input terminals *a* on the other side of "AND" gate circuits corresponding to outputs (or an output) meeting the above-mentioned particular condition.

Figure 2:
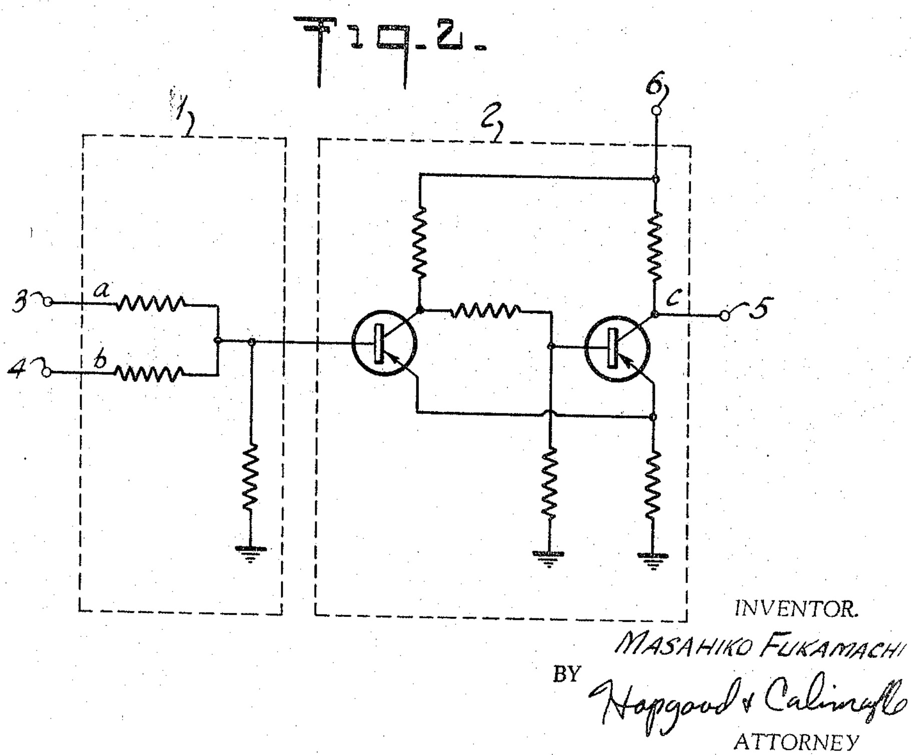
FIG. 2 is a schematic diagram of an AND gate which can be used in the circuit of FIG. 1.

An example of the "AND" gate circuit applicable to this invention is illustrated in FIG. 2, wherein 1 denotes an adder circuit, 2 a Schmitt trigger circuit, 3 and 4 input terminals, 5 an output terminal, and 6 a power supply input terminal.

Referring to FIG. 2, let it be assumed that the Schmitt trigger circuit 2 has been set to the operating point so as to produce a negative voltage of predetermined level at output terminal 5 only when negative voltages of predetermined levels are applied to input terminals 3 and 4. Then it is abvious that the circuit of FIG. 2 operates as a kind of "AND" gate circuit. Now let it be also assumed that any one of the "AND" gate circuits 5.1 through 5.10 in FIG. 1 is provided with the function as described previously with reference to FIG. 2. Then an output appears at output terminal C only when voltages of predetermined levels are applied to input terminals *a* and *b* of the "AND" gate circuit, causing an indicator lamp connected to said output terminal *c* to light. Therefore an indicator lamp which is lit among lamps indicated by 6.1 through 6.10 will correspond to an output (or outputs) that meets both an input condition given by switch group 1 and an input condition given by switch group 2.

There will be cases in which a single input condition is assigned to each of the above noted input matrices, while there would be other cases in which several input conditions may be assigned to each of said input matrices. It will be understood that this invention can find application in either case by performing almost the same operation.

Although a description has been made above in connection with a case in which a plurality of given conditions are divided in two groups for simplicity with the embodiment of FIG. 1, there may be numerous cases in which said given conditions can be divided into more than two groups depending on the contents of said given conditions. In such cases, it is only necessary to install a necessary number of single matrix type structures each composed of parts 1 and 3 as shown in FIG. 1 to provide input terminals equal in number as the matrices for each of a plurality of "AND" gate circuits such as shown at 5.1 through 5.10, and to let an indicator lamp or lamps light for the output corresponding to the input given to all matrices.

Although a description has been made above referring to an embodiment in which the outputs of all matrices are connected in parallel to the "AND" gate circuits, it will be understood that there is no objection if a suitable number of the single matrix structures each composed of switches 2, diodes 4, and gates 5.1 through 5.10 are connected in cascade to constitute an embodiment of the invention. Stated specifically, it is only necessary in such a case to apply the outputs of the "AND" gate circuits in one stage shown, for example, at 5.1 through 5.10 in FIG. 1 to input terminals on one side of "AND" gate circuits in the succeeding stage corresponding to the same specific output, and at the same time to apply the outputs selected by a matrix in the succeeding stage to input terminals on the other side of "AND" gate circuits corresponding to the same output, and to connect indicator lamps for output indication to the output terminals of the "AND" gate circuits in the final stage.

As has been described above referring to the embodiment of this invention of FIG. 1, the decoder circuit according to this invention has a great deal of practical merit in that an output (or outputs) satisfying a combination of specific input conditions can be selected rapidly and easily.

The merit of the decoding circuit according to this invention will further become evident by a comparison made with a prior art single matrix type decoder which has not utilized the principle of dividing the inputs into a plurality of independent groups. Assume that it is necessary to decode input information for a code in which one hundred input conditions correspond to one hundred outputs and said one hundred input conditions can be divided into ten ten-condition groups each independent of one another. If a single matrix type decoder is built, the total number of combinations of input conditions becomes equal to $10^{10}$ even in the comparatively simple case in which only one input condition is invariably given to the machine in each of individually divided condition groups. Therefore a total number of elements required for the single matrix would amount to as many as $100\times10^{10}$, or $10^{12}$. To build such a matrix would be extremely difficult and impracticable, if not impossible. In comparison, the total number of elements required for a decoding circuit according to this invention is only $10\times100\times10$, or $10^4$. It will be clear then, that this invention provides a significant simplification and also makes it possible to decode complex codes with comparatively small-scale equipment, thereby enabling this invention to find application in various fields.

Although a description has been made above in connection with a specific embodiment, it will clearly be understood that this description is made by way of example and not as a limitation to the scope of this invention.

Many modifications can be made without departing from the spirit and the scope of this invention, and this invention includes all modifications falling within the scope of the following claims.

What is claimed is:

1. In a decoding circuit adapted to receive a plurality of input signals divisible into independent groups of signals, the improvement comprising a plurality of diode input matrices each corresponding to one of said groups of input signals, each of said matrices having a plurality of inputs and a corresponding plurality of outputs, a plurality of logical circuits each coupled to only one output from each of said input matrices, and a plurality of indicators each coupled to the output of a corresponding logical circuit for indicating a given input condition on one input of each of said matrices.

2. A decoding circuit comprising a plurality of diode input matrices, each of said matrices having a plurality of inputs and a corresponding plurality of outputs, the outputs of each input matrix being responsive to predetermined inputs thereof, a plurality of AND circuits each coupled to only one output from each of said input matrices, and a plurality of output means each coupled to the outputs of a corresponding AND circuit for indicating a given input condition on one input of each of said matrices.

3. The combination defined in claim 2 in which said AND circuits each comprise an adder circuit connected to feed its output into a Schmitt trigger circuit.

References Cited by the Examiner

UNITED STATES PATENTS

| | | | |
|---|---|---|---|
| 2,950,461 | 8/1960 | Tryon | 340—166 X |
| 2,992,410 | 7/1961 | Groth et al. | 340—166 |
| 3,172,087 | 3/1965 | Durgin | 340—166 X |
| 3,204,221 | 9/1965 | Sierra | 340—166 X |

NEIL C. READ, *Primary Examiner.*

H. I. PITTS, *Assistant Examiner.*